(12) United States Patent
Fedorynski et al.

(10) Patent No.: US 8,468,145 B2
(45) Date of Patent: Jun. 18, 2013

(54) INDEXING OF URLS WITH FRAGMENTS

(75) Inventors: Pawel Aleksander Fedorynski, Menlo Park, CA (US); Rupesh Kapoor, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/293,984

(22) Filed: Nov. 10, 2011

(65) Prior Publication Data

US 2013/0073536 A1 Mar. 21, 2013

Related U.S. Application Data

(60) Provisional application No. 61/535,716, filed on Sep. 16, 2011.

(51) Int. Cl.
*G06F 17/30* (2006.01)

(52) U.S. Cl.
USPC ............ 707/709; 707/811; 709/203; 709/218

(58) Field of Classification Search
USPC ................. 707/736, 722, 768, 728, 706, 709, 707/741, 811, E17.002, E17.108; 709/246, 709/231, 204, 203, 218, 219; 715/234, 239, 715/760, 230, 231
See application file for complete search history.

(56) References Cited

U.S. PATENT DOCUMENTS

| | | | | |
|---|---|---|---|---|
| 5,920,859 | A * | 7/1999 | Li ................................. | 715/205 |
| 6,271,840 | B1 | 8/2001 | Finseth | |
| 6,338,057 | B1 | 1/2002 | Weeks | |
| 6,457,103 | B1 * | 9/2002 | Challenger et al. ..... | 707/E17.12 |
| 6,574,715 | B2 * | 6/2003 | Challenger et al. ..... | 707/E17.12 |
| 6,584,548 | B1 * | 6/2003 | Bourne et al. ................ | 711/134 |
| 6,615,235 | B1 * | 9/2003 | Copeland et al. ............ | 709/203 |
| 6,643,641 | B1 | 11/2003 | Snyder | |
| 6,665,838 | B1 | 12/2003 | Brown | |
| 6,988,135 | B2 * | 1/2006 | Martin et al. ........... | 707/E17.12 |
| 7,827,170 | B1 | 11/2010 | Horling et al. | |
| 8,037,073 | B1 * | 10/2011 | Kapoor et al. ................ | 707/740 |
| 8,346,755 | B1 | 1/2013 | Kapoor et al. | |
| 2003/0188021 | A1 * | 10/2003 | Challenger et al. ........... | 709/246 |
| 2003/0197719 | A1 * | 10/2003 | Lincke et al. ................ | 345/710 |
| 2004/0220914 | A1 | 11/2004 | Cheung et al. | |
| 2006/0046686 | A1 * | 3/2006 | Hawkins et al. ............. | 455/403 |
| 2006/0129463 | A1 | 6/2006 | Zicherman | |
| 2006/0224593 | A1 | 10/2006 | Benton et al. | |
| 2006/0282328 | A1 | 12/2006 | Gerace et al. | |
| 2007/0067267 | A1 | 3/2007 | Ives | |
| 2007/0204285 | A1 | 8/2007 | Louw | |

(Continued)

OTHER PUBLICATIONS

Ikram Chabbouh and Mesaac Makpangouy—"Caching Dynamic Content with Automatic Fragmentation"—iWAS, 2002—Citeseer—(pp. 1-12).*

(Continued)

*Primary Examiner* — John E Breene
*Assistant Examiner* — Anh Ly
(74) *Attorney, Agent, or Firm* — Brake Hughes Bellermann LLP

(57) ABSTRACT

A URL inspector may determine a uniform resource locator (URL) which includes an indexable fragment. A URL separator may separate, from the URL which includes the indexable fragment, a base URL occurring prior to the indexable fragment. An indexer may process content of the base URL to obtain processed content thereof. A rendering system may render the processed content together with the URL which includes the indexable fragment to obtain rendered content. A content converter may convert the rendered content into indexable content.

18 Claims, 5 Drawing Sheets

U.S. PATENT DOCUMENTS

| | | | |
|---|---|---|---|
| 2008/0120277 | A1 | 5/2008 | Pettinati et al. |
| 2008/0282162 | A1* | 11/2008 | Lincke et al. .................. 715/710 |
| 2009/0070200 | A1 | 3/2009 | August |
| 2009/0177957 | A1* | 7/2009 | Bouillet et al. ............... 715/230 |
| 2009/0265760 | A1* | 10/2009 | Zhu et al. ......................... 726/3 |
| 2009/0292984 | A1* | 11/2009 | Bauchot et al. ............... 715/234 |
| 2010/0131488 | A1 | 5/2010 | Dasdan |
| 2010/0174686 | A1* | 7/2010 | Acharya et al. ............... 707/710 |
| 2010/0241621 | A1 | 9/2010 | Randall |
| 2010/0262615 | A1 | 10/2010 | Oztekin et al. |
| 2011/0314011 | A1 | 12/2011 | Buehrer et al. |
| 2012/0203757 | A1 | 8/2012 | Ravindran |
| 2012/0203873 | A1* | 8/2012 | Lewin et al. .................. 709/219 |
| 2012/0239667 | A1* | 9/2012 | Vysyaraju et al. ............ 707/749 |

OTHER PUBLICATIONS

Freeman et al.—"URLs, Routing, and Areas" Chapter 11—ASP. NET MVC 3 Framework, 2011—(pp. 325-383).*

Non-Final Office Action for U.S. Appl. No. 13/293,991, mailed Aug. 29, 2012, 11 pages.

Notice of Allowance for U.S. Appl. No. 12/773,578, mailed Aug. 30, 2012, 17 pages.

Non-Final Office Action Response for U.S. Appl. No. 12/773,578, filed Jul. 3, 2012, 25 pages.

Non-Final Office Action for U.S. Appl. No. 12/773,578, mailed Jan. 4, 2012, 13 pages.

"How to Make Ajax Applications Google-Crawlable", http://www.sitepoint.com/google-crawl-index-ajax-applications/, Apr. 27, 2010, 3 pages.

Peng, et al, "Large-scale Incremental Processing Using Distributed Transactions and Notifications", Proceedings of the 9th USENIX Symposium on Operating Systems Design and Implementation, 2010, 14 pages.

* cited by examiner

INDEXING OF URLS WITH FRAGMENTS

CROSS-REFERENCE TO RELATED APPLICATION

This application claims priority to, and is a nonprovisional of, U.S. Application No. 61/535,716, filed on Sep. 16, 2011, entitled "INDEXING OF URLS WITH FRAGMENTS", the disclosure of which is hereby incorporated by reference in its entirety.

TECHNICAL FIELD

This description relates to indexing of Uniform Resource Locators (URLs) with fragments.

BACKGROUND

In conventional techniques for providing content over a computer network, such as the public internet, a uniform resource locator (URL) may be provided which identifies a location of associated content on the network, so that the thus-identified content may be transmitted over the network to a requesting consumer or other user thereof. It is straightforward and well-known to provide static network content to a consumer or other user in this manner.

Further in these contexts, enhanced conventional techniques have been developed which enable relatively faster, more flexible, and more customizable user experiences with respect to receipt of, and interaction with, network content. For example, in the example of the public internet, a website may be provided to a user which includes one or more portions which may be updated, interacted with, or otherwise modified independently of a remainder of the website in question. In this way, the user may modify only a selected portion of the website, without requiring the time and resources associated with updating the website in its entirety. For example, a website may be provided which provides financial news, and may be associated with a URL such as www.examplefinancialnews.com (intended merely for the sake of example and not intended to identify or reference an actual website). In the example, the website may provide a number of specific stock prices, which may be changing throughout the day, as well as current commentary thereon. Consequently, the website in question may have specifically-identified portions which are each devoted to a particular stock price. Thus, in the example, a user of the website may select one or more of the provided stock prices, and the website may update only those selected stock prices, without requiring an update of any other news or other information provided by the website. More specifically, for example, in response to a selection of a particular stock price by the user, a software function of the website in question may execute to send a request to a remote server for the desired stock price information, and may thereafter update only the relevant portion of the website using the received response. In other well known examples, such as, e.g., web based email accounts, internet search engines, social networking sites, and virtually any other types of network content, it is possible and often desirable to provide and utilize such techniques.

In practice, a typical user experience may be to proceed to a website (e.g., the fictional example website www.examplefinancialnews.com referenced above), either by directly entering the URL into a browser, or by selecting a link to the URL from a separate website. As just described, upon arriving at such a website, the user may make a selection therefrom which results in the type of partial update of the page just described. For example, the user may select a portion of the page which executes a software function to retrieve a current stock price for a selected stock, and to update only a corresponding portion of the page to display the thus-retrieved information. However, the software function which executes this partial update of the page may not, by itself, have any affect on the URL associated with the page as a whole. That is, even though the user in this example is effectively viewing a modified version of the webpage associated with the original URL, it may occur in the example that the originally-entered URL remains the same. Consequently, it may be difficult or impossible for the user in this example to share or otherwise provide a link to the modified version of the page that is actually being viewed by the user. For example, if the user were to copy and paste the URL of the modified webpage in this example (e.g., for providing to another user), then the recipient of the URL, upon selection thereof, would proceed not to the modified version of the webpage created when the original user selected a desired stock price for updating, but rather to the original webpage viewed by the user upon initial selection of the original URL.

In order to address these and related difficulties, techniques have been developed for modifying a URL of a webpage in conjunction with modifications (e.g., partial updates) of the underlying webpage. That is, in the example provided above, when such techniques are implemented with respect to the website in question, then a corollary effect of the selection of the desired stock price by the user is an update and/or modification of the associated URL. For example, the user may proceed to the original website www.examplefinancialnews.com, and, as above, may select a desired stock price for selective updating thereof. At a time of such updating, the techniques just referenced for making associated modifications to the URL may be implemented, so as to thereby obtain a modified URL which corresponds directly to the modified (e.g., partially updated) webpage. Consequently, the user may thereafter be enabled to provide the modified URL, e.g., to another user. As a result, the receiving user may thus be enabled to select the provided link and thereby proceed directly to the modified version of the webpage which the original user previously viewed, and intended for the receiving user to view, as well.

Techniques are known for providing a modified URL which corresponds directly to a modified webpage, where such techniques may leverage existing techniques used to create and generate URLs in other contexts. Specifically, for example, certain techniques for formulating such specialized URLs are known to rely on the use of so-called URL fragments, which refer to particularly designated character strings within a URL serving the particular function of, e.g., identifying a specific portion of a webpage within the webpage as a whole. For example, such particularly designated character strings within a URL may include a URL character string which is offset by, e.g., follows after, the pound sign (i.e., the symbol "#"). For example, it may occur that a fictional example website www.examplesportsnews.com is a particularly lengthy page and/or is divided into particular topical subsections (e.g., football, basketball, or various other sporting news). In such cases, one or more URL fragments may be used to enable a reader of the website to perform intra-site navigation. For example, it may occur that the user initially proceeds to the original URL, www.examplesportsnews.com, whereupon the user may view a list of identified subsections included therein, as just described. In the example, the user may wish to select a link to the subsection devoted to football. Upon selection of the corresponding link, the user may be directly provided with the subsection of the webpage which includes, or is devoted to, discussion of football. In such a case, according to conventional use of URL fragments, the user will be provided with the selected subsection, and the displayed URL within the browser will reflect the selected fragment, as well (and can therefore be provided to other users). For example, the updated URL may be displayed as, e.g., www.examplesportsnews.com#football. In similar, related examples, it may occur that the user initially views a separate website which contains a link to the football subsection. That is, the user may initially be viewing a website which contains a link that is identified as pointing directly to the football subsection of the fictional example website, and may therefore select the provided link in order to navigate directly thereto. In practice, in the example, as just described, the URL associated with the provided link may include the relevant URL fragment as described above. Therefore, in practice, upon selection of the link by the user, the browser of the user may obtain the fictional example sports news website in its entirety, and then may identify the included URL fragment as such to thereby proceed immediately to the identified football subsection for providing to the user within the browser.

Thus, it may understood from the above that, on the one hand, conventional techniques for providing selective or partial updates to a webpage through implementation of software functions which are capable of independently modifying such selected portions may provide the benefits of an increased loading speed of specifically desired information, as well as a generally more interactive user experience. On the other hand, such conventional technologies, by themselves, may suffer from the deficiency of failing to enable a direct linking to such partially updated and/or modified webpages. Meanwhile, conventional usage of URL fragments enable usage of modified URLs which point specifically to desired information within a larger website context. Subsequently, solutions have been implemented which leverage existing URL fragment techniques to enable direct linking to partially updated/modified webpages, i.e., to automatically generate modified URLs containing URL fragments which correspond directly to webpages which have been partially updated and/or modified. Specifically, for example, websites which are enabled with the ability to provided selective or partial updating and/or modifications thereof may further include software functionality for generating a modified URL containing a URL fragment for each such selective or partial updating and/or modification. As a result, a user may be provided with a modified URL which has a one-to-one correspondence with a modified webpage, so that the user may thereafter utilize such a modified URL to provide a direct link to the specific modified version of the webpage in question.

To give a specific example in the context of the examples provided above, it may occur that a user initially navigates to the fictional example website www.examplefinancialnews.com, and thereafter selects a particular stock, the selection of which has at least two separate but related affects. First, as described, the selection of the stock may cause execution of software functionality for dynamically retrieving a current price or other information about the stock, and thereafter updating the webpage to include the thus-retrieved current information, while leaving the remainder of the page intact. Second, at the same time, software functionality may be implemented which generates a modified URL containing a URL fragment which is uniquely related to, and identifies, the resulting, partially-modified webpage which includes the current stock information. Thus, the user's experience is to navigate to the fictional example website www.examplefinancialnews.com, select a desired stock for updating thereof, and thereafter view the modified version of the website containing the updated, current stock information, while simultaneously viewing an updated, modified URL containing a URL fragment, such as, e.g., www.examplefinancialnews.com#currentstockinformation. As also described, if the user thereafter provides the modified URL with the generated URL fragment (www.examplefinancialnews.com#currentstockinformation) to, e.g., a receiving user, then the receiving user, upon selection of the modified URL with the URL fragment, may be directly provided with the corresponding modified webpage which was viewed by the original user, and which the original user wished to share with the receiving user as such. More specifically, upon selection of the modified URL with the URL fragment by the receiving user, the browser of the receiving user may navigate to the www.examplefinancialnews.com website and simultaneously trigger execution of the software functionality which provides the relevant update and/or modifications thereto (e.g., the update of the stock information in question). As is known, as a relic (in this context) of conventional URL fragment technology, the browser of the receiving user also may attempt to jump to a portion of the website in question which corresponds to the included URL fragment; however, since no such identified portion actually exists within the modified webpage, the browser of the receiving user will take no action in this regard. Instead, as described, the receiving user will merely be provided with a webpage which corresponds to the updated and/or modified version thereof, which was originally viewed by the original user and which the original user desired to link to directly for the benefit of the receiving user.

In summary, the above-described techniques provided workable solutions for providing a net effect in which users are both provided with selectively and/or partially modifiable webpages (and associated benefit thereof), as well as an ability to provide direct links to such modified webpages (through the use of URL fragments). However, such solutions, although workable for the purposes and advantages just referenced, may be problematic at best for satisfying various other needs of at least some network users. For example, search engine providers and others seeking to catalogue, characterize, or otherwise analyze network content may use conventional technologies to crawl and/or index network content. For example, as is well known, various search engine providers may use, e.g., software agents and associated algorithms for crawling a plurality of websites, and may use associated indexing techniques in order to make the crawled content easily searchable by and for network users. However, the types of selectively and/or partially modified webpages (having corresponding modified URLs with URL fragments) may be difficult and/or impractical to index.

For example, it may be appreciated from the above discussion that conventional or original usages of URL fragments are essentially incompatible with conventional indexing techniques. Specifically, such conventional and/or original URL fragments, as described, merely point to a portion within a larger webpage. Consequently, it is generally inefficient, useless, or wasteful to provide indexing for such conventional and/or original URL fragments, because such indexing efforts would essentially be duplicative and redundant, particularly when indexing a plurality of conventional and/or original URL fragments associated with a single larger webpage. Consequently, for example, it may be common for indexing techniques to disregard URL fragments during indexing processes, and to proceed with indexing only the content of the underlying webpage. Conversely, as described, selectively and/or partially modified webpages which have been associated with a corresponding modified URL including a URL fragment, may, virtually by definition, include unique or otherwise useful information which may not be, or is not, included in the underlying webpage. Therefore, it may be valuable to index such unique or otherwise useful information with the selectively and/or partially modified webpages. As may be observed, however, the contrasting usages of URL fragments in these two different context is problematic or incompatible, because an indexing system which receives a modified URL which includes the URL fragment which corresponds to a selectively and/or partially modified website may proceed simply by removing the contained URL fragment, and thereafter indexing only the contents of the underlying, unmodified webpage. As a result, unique or otherwise useful information may fail to be indexed or otherwise made available or searchable in a convenient way over the network.

It is possible for website providers or other parties having appropriate access and administrative rights for selectively and/or partially modifiable webpages to make all modified versions and associated modified URLs containing URL fragments indexable and thus searchable using the network. For example, website providers may provide indexable versions of their selectively and/or partially modifiable website, which may then be indexed in a normal fashion. However, such techniques are generally burdensome at best for the website providers, and, moreover, introduce possibilities of inaccurate or incomplete indexing, such as in scenarios where the indexable version of a website provided by the website provider does not fully or accurately represent the included content. As a result, no adequate solution exists for providing indexing of selectively and/or partially modifiable websites which have in fact been modified and identified using a corresponding modified URL containing a URL fragment.

SUMMARY

According to one general aspect, a computer system may include instructions stored on a computer-readable medium and executable by at least one processor. The computer system may include a URL inspector configured to cause the at least one processor to determine a uniform resource locator (URL) which includes an indexable fragment, and a URL separator configured to cause the at least one processor to separate, from the URL which includes the indexable fragment, a base URL occurring prior to the indexable fragment. The computer system may further include an indexer configured to cause the at least one processor to process content identified by the base URL to obtain processed content thereof, a rendering system configured to cause the at least one processor to render the processed content together with the URL which includes the indexable fragment to obtain rendered content, and a content converter configured to cause the at least one processor to convert the rendered content into indexable content.

According to another general aspect, a computer-implemented method may include executing instructions stored on a computer-readable medium. The method may include determining a uniform resource locator (URL) which includes an indexable fragment, separating, from the URL which includes the indexable fragment, a base URL occurring prior to the indexable fragment, and processing content identified by the base URL to obtain processed content thereof. The method may further include rendering the processed content together with the URL which includes the indexable fragment to obtain rendered content, and converting the rendered content into indexable content.

According to another general aspect, a computer program product may be tangibly embodied on a computer-readable medium and may include executable code that, when executed, may be configured to cause a data processing apparatus to determine a uniform resource locator (URL) which includes an indexable fragment, and separate, from the URL which includes the indexable fragment, a base URL occurring prior to the indexable fragment. The executable code, when executed, may be further configured to process content identified by the base URL to obtain processed content thereof, render the processed content together with the URL which includes the indexable fragment to obtain rendered content, and convert the rendered content into indexable content.

The details of one or more implementations are set forth in the accompanying drawings and the description below. Other features will be apparent from the description and drawings, and from the claims.

DETAILED DESCRIPTION

Figure 1:
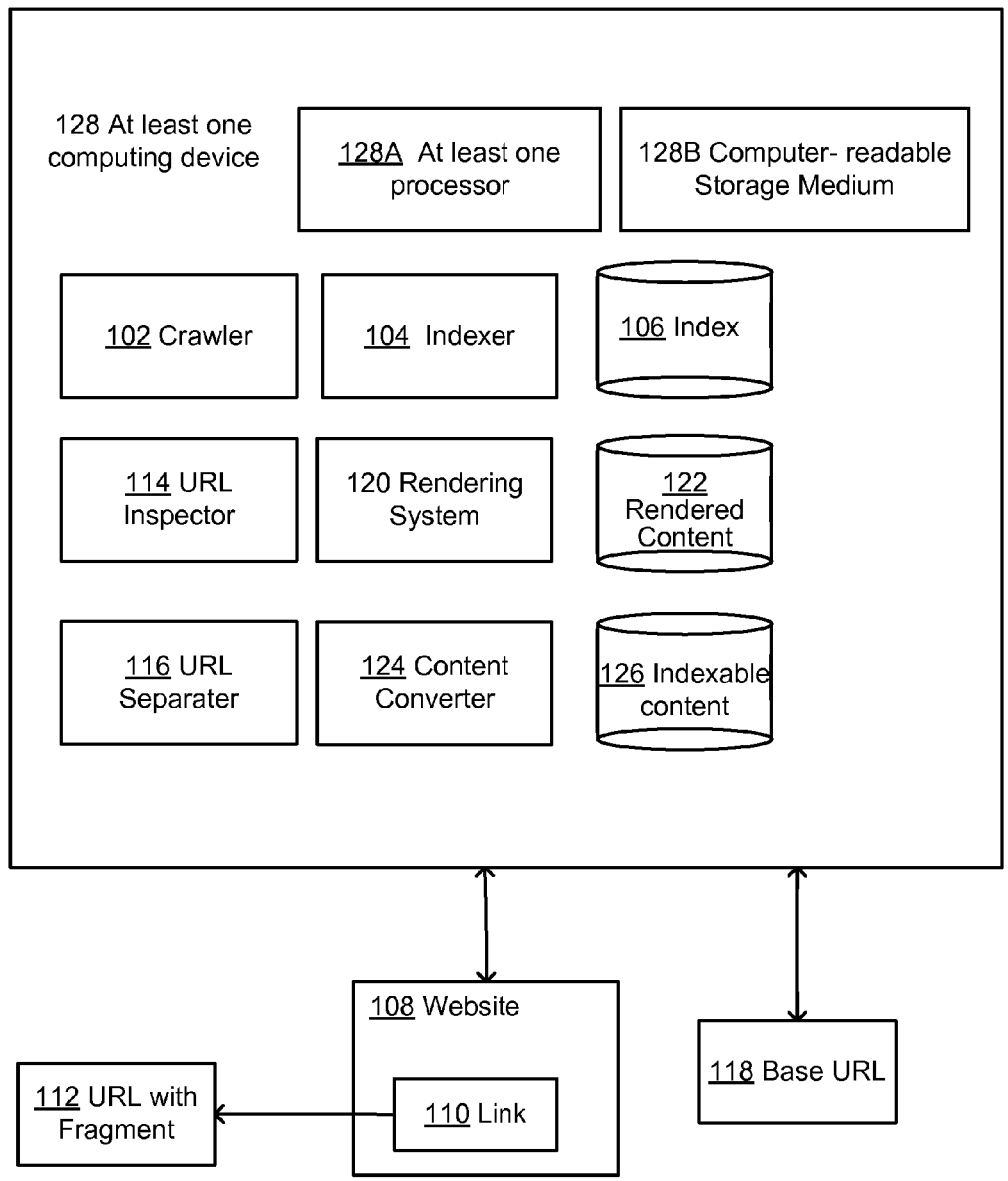
FIG. 1 is a block diagram of a system for indexing content of a website associated with a URL containing an indexable fragment.

FIG. 1 is a block diagram of a system 100 for indexing content of a website having a URL with an indexable fragment. As referenced above, and as described in detail herein, such content conventionally may be difficult or impossible to fully index, and/or may require substantial effort and resources on the part of the content provider to enable even limited indexing of such content. The system 100 of FIG. 1, on the other hand, may be configured to partially or completely index such content, with little or no effort required on the part of the content provider to index the content. Consequently, the system 100 may facilitate accurate and complete indexing of such content, so as to thereby make the content searchable, accessible, or otherwise usable for a variety of consumers or other users. Moreover, the providers of the content may be assured that the content will be more likely to reach an intended audience.

In the example of FIG. 1, a crawler 102 may be configured to perform, in addition to various other specific functions as described in detail below, conventional network crawling techniques. As is generally well known, such conventional crawling techniques may include, e.g., the use of software agents and/or other software programs to visit or otherwise access network sites (e.g., websites), so as to discover, extract, process, and otherwise utilize information available on a particular network (e.g., the public internet). During such crawling operations, some or all of the crawled content may be processed in various desired and conventional manners. For example, specific content or type of content may be identified or characterized as such, while undesired or not useful content may be filtered or ignored.

In operation, then, the crawler 102 may designate or determine one or more initial websites for crawling thereof, and may thereafter assign a corresponding number of software agents to visit and access the designated websites. During such access, the crawler 102 may come upon one or more links which are included within the content of the visited page, and may thereafter extract and follow the included link to the thus-identified linked website. Upon reaching the linked website, crawling operations may continue with the identification, extraction, and following of additional links (and other content) contained therein. In this way, the crawler 102 may organically explore many different linked websites, simply by identifying and following some or all of the links included within each crawled website page or other content.

An indexer 104 may be configured to received crawled content of the various websites crawled by the crawler 102, and to thereafter index the received crawled content for subsequent storage of the resulting indexed, crawled content within an index 106. In general, indexing operations of the indexer 104 may include the selection of certain words or other content from the crawled content received from the crawler 102, along with subsequent storage within the index 106 of the selected content along with one or more locations at which the indexed content is available.

For example, if the crawler 102 crawls one or more websites related to information about the president of the United States, then the indexer 104 may select the name Barack Obama for storage within the index 106 in conjunction with a location of each of the particular websites which were crawled and which contain the indexed content. In this way, a user who enters the name Barack Obama into a search engine associated with the index 106 may be provided in return with one or more of the websites which were crawled and which contained the indexed content, and which therefore may be likely to contain information which satisfies the search request of the user.

Of course, the above discussion and related examples provided with respect to the crawler 102, the indexer 104, and the index 106 are merely intended to provide a high level understanding of the basic functions and operations of the illustrated components. It will therefore be appreciated that many additional or alternative functions and operations may be implemented by the crawler 102, the indexer 104, and the index 106, where such additional or alternative functions and/or operations would be apparent to one of skill in the art, except as described otherwise herein.

For example, it would be appreciated by one of skill in the art that the crawler 102 may implement one or more specialized algorithms which are designed to guide crawling operations of the crawler 102 so that information most likely to be useful to the indexer 104 is actually crawled and obtained. In other examples, the indexer 104 may include many additional or alternative indexing operations, not specifically described herein. For example, the indexer 104 may index content in conjunction with various synonyms or potential misspellings of the selected content to be indexed, so as to thereby increase a likelihood that a user attempting to enter the content in question will be enabled to satisfactorily complete a search for related information. In other examples, the indexer 104 may include specific techniques for ranking indexed websites relative to one another with respect to related, indexed content, again so as to increase a likelihood of a satisfactory search result. Consequently, it will be appreciated from the above discussion that many conventional and/or optional features of the crawler 102, the indexer 104, and the index 106 are not described herein in detail, except as may be necessary or helpful in understanding example operations of the system 100 of FIG. 1.

During operation of the system 100, and as referenced above, the crawler 102 may encounter and crawl various different websites, represented in FIG. 1 by the example website 108. As part of the crawling process, the crawler 102 may perform a link identification and extraction of one or more links within the website 108 which reference, identify, and locate corresponding websites. In the simplified example of FIG. 1, a link 110 is illustrated as linking to a website 112 which is identified by, or otherwise associated with, a uniform resource locator (URL) which includes an indexable fragment.

To give more specific examples, the website 108 may be understood to include or represent a blog, discussion board, article, or virtually any website which may contain the link 110. The website 112 may represent virtually any of the above-referenced types of websites which are designed and constructed to include dynamic content which is provided at least in part including client side functionality for providing partial updates or other partial renderings within the website 112 as a whole. For example, as described in detail above, the website 112 may include or be associated with a default, initial, or otherwise base website 118 which may, at least initially, be viewed by a user thereof, and which includes one or more instances of the above-referenced type of dynamic content which is provided to a user as part of a partial updating or other partial rendering thereof.

To continue the specific, simplified examples provided above, the website 112 may be associated with an underlying default "front page" 118 of the example website www.examplefinancialnews.com, which may itself include Asynchronous Javascript and XML (eXtensible Markup Language) (AJAX) content which, when selected by a viewer of the front page of the website www.examplefinancialnews.com, executes a Javascript code or other known technique for providing a partial update or other partial rendering of the website front page. As described above, such partial renderings may be associated with updating of the default, initial front page URL of the website 118 to include a fragment which represents and identifies the partially updated version of the website, i.e., the website 112.

For example, as referenced above, the front page or base URL www.examplefinancialnews.com may be updated to include a fragment which thus represents the partially updated webpage, e.g., www.examplefinancialnews.com#selected_stock. In the simplified example of FIG. 1, the website 118 associated with the base URL of the website 112 which includes the URL fragment is illustrated separately for the sake of clarity, however, it will be appreciated that in practice the website 112 may share some or many of the properties of the website 118, except to the extent that the website 112 has been partially updated or otherwise partially rendered differently from the website 118, e.g., in accordance with the selection and execution of AJAX or other dynamic content included or referenced within the website 118.

Thus, in the example of FIG. 1, it is assumed that a viewer or other consumer of the website 118 including the base URL (e.g., www.examplefinancialnews.com) has selected dynamic content (e.g., AJAX content) in order to execute associated Javascript or other executable code for performing a client-side (e.g., browser-based) partial update of the website 118 to thereby obtain the website 112 which includes the thus-updated version of the website 118, and which is associated with the URL and associated fragment which together identify the updated website 112 (e.g., www.examplefinancialnews.com#select$_{13}$ stock). Subsequently, as shown, a viewer or other consumer of the website 112 may include the link 110 thereto within the content of the website 108, where the website itself otherwise may or may not be specifically related to the websites 112, 118.

Then, during operation of the system 100, as described above, the crawler 102 may crawl the website 108 and detect the link 110 to the website 112. In conventional crawling techniques, a crawler such as the crawler 102 may be configured to detect a presence of a fragment within the URL associated with the link 110 identifying the website 112. For example, such fragments may be recognized by the presence of identifying characters within the URL in question, e.g., the symbol # may indicate that, as described above, all following text refers to a fragment. In conventional crawling techniques, however, recognition of a fragment is typically followed by a removal and discarding of the fragment, because, as explained above, such fragments are understood to represent a pointer to a specific portion of webpage content. As a result, as also referenced above, it is nonproductive at best to attempt to crawl and index website content identified by such conventional fragments which point to a particular portion of a web page (referred to herein as pointer fragments for clarity and consistency of terminology), since such crawling and/or indexing efforts would be wholly duplicative of resources spent in crawling and/or indexing an underlying webpage identified by a URL without the conventional pointer fragment.

As described herein, however, some fragments serve a different, additional, purpose than conventional pointer fragments which are designed merely to point to, or otherwise identify, specific content within a larger website. Specifically, as described, some fragments are generated for inclusion within a URL for the purpose of making dynamically or partially updated webpages linkable in their updated form. As a result, execution of conventional crawling techniques result in the removal of such fragments, and the consequent loss of the ability to perform any further attempts at indexing the entirety of the dynamically updated website (e.g., of the website 112), and, in particular, results in an inability to index the dynamic content which was included within the website 112 as a result of client side execution of java script or other executable code which resulted in the creation of the website 112 (and associated URL and fragment) in its updated form relative to the underlying website 118.

Consequently, the system 100 includes a URL inspector 114 which is configured to receive or otherwise determine the URL with fragment that is associated with the website 112 and identified by the crawler 102 during extraction of the link 110. Thereafter, the URL inspector 114 may be configured to identify the fragment within the URL and fragment of the website 112, and thereafter may be configured to determine whether the identified fragment represents a conventional pointer fragment, as opposed to a fragment which has been generated in association with dynamically updated content. As described in detail herein, in cases where the URL inspector 114 determines that a particular fragment represents a conventional pointer fragment, then conventional techniques for handling such conventional pointer fragments may be followed (e.g., the pointer fragment may be removed and discarded and conventional indexing of the thus-determined base URL may proceed).

In other instances, however, the URL inspector 114 may determine, as in the example of FIG. 1, that the fragment of the URL associated with the website 112 is associated with specific, client side execution and rendering of a partial update or other modification of the underlying website 118. In such cases, as described in detail herein, the system 100 may thereafter proceed with indexing of the website 112 in its entirety, and including in particular the dynamically updated portion thereof which is associated with the fragment contained within the URL of the website 112. As a result, as a matter of nomenclature, such fragments are referred to herein as "indexable fragments," and, as may be understood from the description herein, such indexable fragments thus refer to fragments included within URLs in association with, and providing identification of, client side execution and associated dynamic updating of an underlying website and associated URL (e.g., the website 118).

Thus, the URL inspector 114 may be configured to detect or identify a presence of a fragment within a linked URL extracted during a crawling process of the crawler 102, and thereafter to determine whether the identified fragment is an indexable fragment or a conventional pointer fragment. Consequently, if the identified fragment is determined to be a conventional pointer fragment, then conventional indexing may proceed, including, e.g., a removal of the identified fragment followed by conventional indexing of the webpage associated with the thus-obtained base URL. On the other hand, if the URL inspector 114 identifies the fragment as an indexable fragment, then additional indexing processes and related techniques may be executed, as described in detail below.

Various example techniques may be used by the URL inspector 114 in determining whether an identified fragment is an indexable fragment or a conventional pointer fragment. For example, an operator of the system 100 may create and maintain a simple list of websites which include dynamic content, so that the URL inspector 114 may simply consult the list to determine a presence (or lack thereof) of a URL associated with dynamic content and thus likely to include an indexable fragment. In other examples, producers or other providers of websites may be advised to include a known symbol for identifying an indexable fragment as such when creating or maintaining their websites. For example, a provider of the websites 118 and/or 112 may cause the URL with associated fragment of the website 112 to include such a particular character or other symbol therein, for subsequent recognition thereof by the URL inspector 114. For example, such techniques may include inclusion of an exclamation mark (!) after the # symbol traditionally associated with fragments. In such an example, the URL with associated fragment of the website 112, and the examples provided above, may be written as www.examplefinancialnews.com#!selected_stock.

It may be appreciated from the present description that attempts by the URL inspector 114 to identifying indexable fragments within a URL within an included fragment may inadvertently or undesirably identify a conventional pointer fragment as an indexable fragment. In such cases, it will be appreciated that the system 100 may proceed in attempting to treat the URL with the included (mis-identified pointer) fragment as if the included fragment were an indexable fragment. In such cases, however, no information need be lost (e.g., all relevant information may still be indexed accurately and completely) even if marginal efficiency and use of the associated computing resources may be compromised by unnecessarily attempting to process such a conventional pointer fragment as an indexable fragment.

Consequently, it may be appreciated that the URL inspector 114 may, in some instances, simply proceed with treating all the detected URLs with included fragments as including indexable fragments, and may thereafter determine that a particular fragment is a conventional pointer fragment only after a corresponding failed attempt to process the URL and included fragment as if the included fragment were an indexable fragment. Again, such techniques may involve at least a marginal decrease in efficiency which may or may not be acceptable or desirable relative to a convenience or other advantage of processing detected fragments in this manner.

Of course, combinations of the above techniques, as well as other techniques not specifically described herein, may be implemented by the URL inspector 114 in order to determine a presence of an indexable fragment within a URL. For example, the URL inspector 114 may initially search for the presence of a particular symbol within the fragment, (e.g., an explanation mark or other agreed upon symbol), and/or may consult an associated list for a presence of the relevant URL and associated fragment. In case both such efforts fail, the URL inspector 114 may proceed with subsequent processing of the URL with included fragments as if the included fragments were an indexable fragment, and thereafter may halt attempts at treating the fragment as an indexable fragment if and when the subsequent processing reveals that the fragment in question represents a conventional pointer fragment.

In still other examples, more detailed or sophisticated algorithms may be implemented by the URL inspector 114 to determine a potential presence of an indexable fragment within a URL. For example, the URL inspector 114 may collect statistics and other heuristics for assigning a likelihood that a detected fragment represents an indexable fragment. For example, the URL inspector 114 may track such information with respect to particular websites, or with respect to websites related to particular topics and/or provided by common publishers or other providers. Somewhat similarly, information may be collected with respect to the website 108 which provides the link 110 to the website 112. It will be appreciated that such information may be collected over time and/or with respect to many different websites, and that the URL inspector 114 may employ one of many different types of known machine learning algorithms for using such collected information to predict with a high degree of accuracy whether a particular fragment within a URL represents an indexable fragment.

Once a fragment within a URL is identified as an indexable fragment, a URL separator 116 may proceed to separate the URL including the fragment into at least two separate URLs, e.g., a base URL which does not include the fragment, and a second URL which does include the fragment, e.g., the entire URL and included fragment in question. For example, as may be appreciated from the above discussion, the website 112 may include a URL (e.g., www.examplefinancialnews.com#selected_stock) which includes an indexable fragment (e.g., #selected_stock), which has been recognized as such by the URL inspector 114. In such an example, the URL separator 116 may proceed to separate the URL with included fragment of the website 112 into a base URL (e.g., www.examplefinancialnews.com) and a second URL which includes the indexable fragment (e.g., www.examplefinancialnews.com#selected_stock). In the example, the base URL, as referenced above, may identify the website 118 which identifies an underlying front page which was partially updated to obtain the website 112 as such. In general, it may be appreciated that the term "base URL" may refer to any URL which is obtained in conjunction with, or representing, a removal of the indexable fragment selected by the URL inspector 114.

The URL separator 116 may be further configured to store the thus-obtained base URL in association with the URL including the indexable fragment. For example, as described in detail below, both the base URL 118 and the URL including the indexable fragment of the website 112 may be stored within a common table of the index 106, together with a common flag or other identifier which associates the two URLs and/or websites with one another. In other examples, the two URLs provided by the URL separator 116 may simply be stored within the same memory (e.g., within the same row of a table), or otherwise linked or associated within the memory. For example, the memory used to include the index 106, or other appropriate memory in communication with the index 106, may be used.

It may be appreciated from the above discussion that the website 118 associated with the base URL may be crawled, indexed, or otherwise processed in a completely conventional manner, so as to obtain indexed contents thereof within the index 106. Further, it may be appreciated that such processing of the website 118 may proceed either independently of, or in conjunction with, subsequently described processing of the website 112 which includes the dynamically/partially updated portions thereof associated with the indexable fragment within the URL of the website 112. For example, the website 118 may be crawled previously to a crawling of the website 112, and/or may be crawled and otherwise processed subsequently to identification of the indexable fragment by the URL inspector 114. In still other examples, it may occur that the base URL of the website 118 is utilized for indexing or other processing in conjunction with (e.g., in direct response to) storage of the URL and associated fragment of the website 112 by the URL separator 116.

In one or more of the above or related example scenarios, a rendering system 120 may ultimately receive or access the content of the website 118 identified by the base URL, together with the URL and included indexable fragment associated with the website 112. As described in more detail herein, the rendering system 120 may proceed to render all available content associated with the websites 118 and/or 112 as rendered content 122. For example, as described, the website 112 may represent a result of browser-based, client-side, dynamic execution of Javascript or other embedded code associated with the website 118 which results in, or otherwise provides, the partially updated or otherwise modified version of the website 118 which is illustrated in the example of FIG. 1 of the website 112, and which includes the modified URL with the included indexable fragment, as described herein. More generally, as described, such embedded resources may include, e.g., such Javascript code, other types of code performing similar and/or related functions, cascaded style sheets (CSS), images or audio and/or video files, or any other embedded content or resources associated with the website 118 and included within the website 112.

In particular examples described herein, the rendering system 120 may provide the rendered content 122 as including a document object model (DOM) tree which represents an entirety of a structure and content of the website 112, including the dynamically updated portions thereof associated with the indexable fragment included within the URL of the website 112. Such DOM trees are, by themselves, well known in the art, and are generally understood to include nodes which represent elements or other structures of a webpage, together with edges or other connectors which connect the nodes according to relationships between the elements and/or structures, to thereby represent an overall structure of an underlying webpage.

As is known, such DOM trees may be constructed and/or utilized partially or completely at a client or on a client side of a network interaction in which a user used the website such as the websites 118 and/or 112. That is, for example, a user may initially download and view the website 118 using a conventional browser. In so doing, the user may, as described above, select various links which cause execution of related Javascript code and associated partial updating of the website 118, (e.g., to thereby obtain the website 112). Thus, during such operations, the browser or other client side code of the viewing user may be configured to construct a DOM tree representing the resulting structure and appearance of the website 112, which may then be used in a conventional manner to actually render the website in the manner experienced by the user and/or viewer.

It may be appreciated that, in conventional crawling and indexing techniques, the crawler 102 and indexer 104 would have limited or no access to such a rendered DOM tree. That is, as described, the crawler 102 conventionally operates by visiting one or more servers which provide the websites 118 and/or 112, and by downloading therefrom the associated code (e.g., hypertext markup language (HTML code)) which represents the website being crawled as well as linked websites which are ultimately also crawled and indexed. Such crawled content does not typically include the actual content (e.g., embedded resources) which are intended to be rendered as such in a browser. For example, the crawled content may include a single line of javascript code designed to be invoked by a browser to thereby retrieve a remote resource to be rendered. Therefore, crawling and indexing of this single line of code, as such, does not provide indexing of the actual embedded resource, but rather just the indexing of the line of javascript code, which by itself is not helpful in this regard. Moreover, as described, conventional crawled content may not include any fragments (much less indexable fragments identified as such), because conventional crawling may be typically designed to delete fragments on the assumption that such fragments represent only conventional pointer fragments. In the system 100 of FIG. 1, however, the rendering system 120 may be configured to use the base URL of the website 118 (and associated processed contents thereof) together with the URL and included fragment of the website 112, as provided by the URL separator 116 and corresponding associated memory, to thereby obtain the rendered content 122, which includes the substance of all embedded resources and other content of the website 112.

A content converter 124 may be configured to thereafter convert the rendered content 122 into a format which is compatible for indexing by the indexer 104. In other words, the content converter 124 may be configured to convert the rendered content 122 into indexable content 126, so that the indexer 104 may proceed, e.g., in a normal fashion, with indexing of the indexable content 126 for inclusion within the index 106 itself.

For example, in the examples given above in which the rendering system 120 provides the rendered content 122 including a DOM tree representing the website 112 (and determined from a combination of processing results obtained based on the website 118 and the website 112), the content converter 124 may be configured to convert the resulting DOM tree into the indexable content 126 including serializing the DOM tree to obtain an HTML representation thereof. In other words, an output of the content converter 124 may include an HTML representation of the website 112, including an HTML representation of all dynamically or partially updated and/or modified content included therein, and all other embedded resources.

Such HTML content may thereafter be conventionally indexed by the indexer 104 for storage within the index 106. In this way, the website 112 may be made searchable or otherwise available or useful to search engines or other tools used to locate, identify, and/or analyze websites. As a result, a provider of the websites 118 and/or 112 may have the benefit of knowing that potential website viewers are fully enabled to discover available and potentially useful content, and thereby increase viewership and other benefits associated with increased traffic to the websites 118 and/or 112. At the same time, consumers and other potential viewers of the websites 118 and/or 112 may be more likely to obtain a desired or useful result when performing a search using a search engine, or otherwise when attempting to view or use desired information available on the network.

In the example of FIG. 1, the system 100 is illustrated as executing on at least one computing device 128, which is itself illustrated as including at least one processor 128A together with a computer readable storage medium 128B. Of course, it may be appreciated that many different variations of the system 100 are therefore contemplated by the illustration of the example of FIG. 1. For example, the system 100 may be executed using a single server computer, which may have, or utilize, a plurality of processors and associated memories. In other examples, the system 100 may be executed using two or more computers, each of which may have one or more processors and/or memories, and which are in communication with one another to execute the various functions, and related functions, described above with respect to FIG. 1.

Similarly, it may be appreciated that the various components described above and illustrated as executing on the at least one computing device 128 may be implemented differently than in the example of FIG. 1. For example, two or more components illustrated separately may be executed together, and/or as part of a larger component. Conversely, a component illustrated individually may be executed using a combination of two or more components. For example, the URL inspector 114 and/or the URL separator 116 may be implemented as part of the crawler 102, while, in other examples, the rendering system 120 and/or the content converter 124 may be considered to execute as part of the indexer 104. Similarly, although the various memories 106, 122, 126 are illustrated separately, it may be appreciated that data stored therein may be stored together or separately within one or more memories. Thus, the computer readable storage medium 128B may represent one or memories present on one or more computing devices which may be used to store the various data within the illustrated memory 106, 122, 126. Still further, the computer readable storage medium 128B may represent one or memories upon which computer readable code executable by the at least one processor 128A may be stored, including instructions which, when executed by the at least one processor 128A, cause the at least one computer device 128 to execute the various features and functions of the system 100 described herein.

Figure 2:
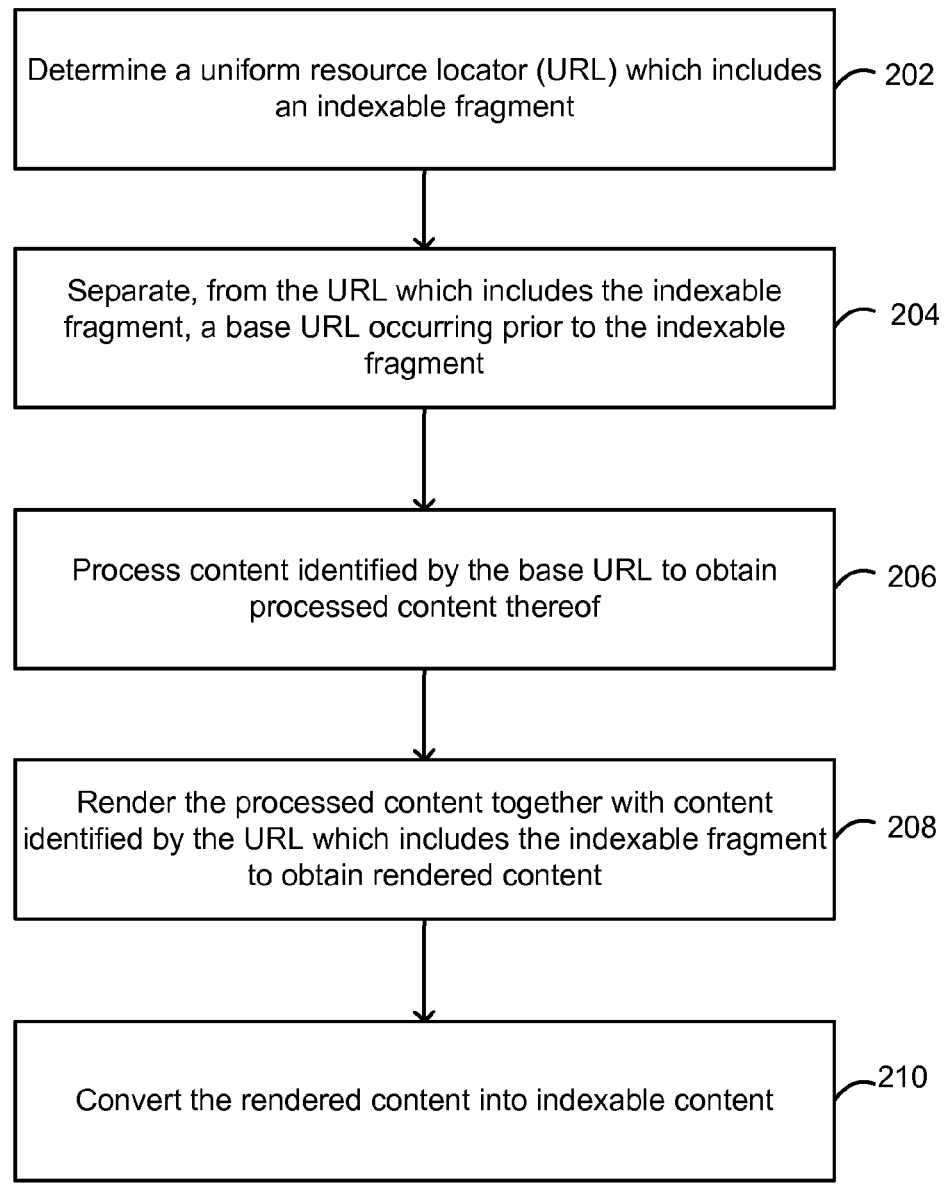
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate operations occurring in a sequential order. However, it may be appreciated that FIG. 2 merely provides a non-limiting example of operations of the system 100 of FIG. 1, and that additional or alternative operations may be implemented. For example, operations may be performed in a partially or completely overlapping or parallel manner, or may be performed in a different order than that shown. Further, additional or different operations may be included, and some or all of one or more operations may be removed.

In the example of FIG. 2, a uniform resource locator (URL) which includes an indexable fragment may be determined (202). For example, the URL inspector 114 may be configured to receive a URL from the crawler 102 (e.g., may receive the link 110 extracted by the crawler 102 when crawling the website 108, where the link 110 provides the URL and included fragment associated with the website 112). As referenced above, the URL inspector 114 may execute one or more various algorithms for identifying an included fragment within the URL, and for determining whether the included fragment represents an indexable fragment which, e.g., includes or references a website associated with corresponding dynamic, client side updates to an underlying website associated with a base URL of the URL which includes the indexable fragment.

Thus, such a base URL occurring prior to the indexable fragment may be separated from within the URL which includes the indexable fragment (204). The URL separator 116 may be configured to separate the base URL of the website 118 from the URL which includes the indexable fragment of the website 112. As described, the URL separator 116 may be configured to store the resulting base URL and URL which includes the indexable fragment in association with one another.

Content identified by the base URL may be processed to obtain process content thereof (206). For example, the crawler 102 and/or the indexer 104 may be configured to perform various processing of the base URL associated with the website 118. For example, the crawler 102 may crawl the website 118 to perform conventional crawling functions, e.g., extraction of links therefrom, filtering of content that is desired to be crawled or indexed, and various other conventional functions. Similarly, the indexer 104 may perform some or all of various conventional indexing functions, so as to provide the crawled content identified by the base URL within the index 106.

It may be appreciated that the processing of the content identified by the base URL to obtain the processed content may occur at one or more different stages within operations of the system 100. For example, it may occur that the website 118 is initially and independently processed by the crawler 102 and/or the indexer 104, during operations of those components in performing their conventional functions. For example, the crawler 102 may encounter a link to the website 118 during crawling of a different, possibly largely unrelated website, (not specifically illustrated in the example of FIG. 1). As a result, indexing of the website 118 associated with the base URL may already have occurred, prior to crawling of the website 108 and associated extraction and subsequent processing of the link 110. Consequently, it may be possible to obtain the processed content identified by the base URL by obtaining such previously processed content, in other words, in the example of FIG. 2, it may occur that the processing of the base URL content may occur prior to the determination of the uniform resource locator with the indexable fragment and subsequent separation thereof into the base URL and the URL which includes the indexable fragment. In other examples, it may occur that the actual separation of the base URL may be used to initiate processing of the content thereof. In other words, upon determination of the base URL by the separator 116, the website 118 may be crawled and/or otherwise processed as necessary or desired in response thereto. In still other examples, it may occur that the URL which includes the indexable fragment and the separated base URL are stored at a time of separation, and that processing of the content identified by the base URL may occur at a later time, such as, similarly to the examples described above, during an otherwise independent crawling of a different website which links explicitly to the base URL of the website 118 (where again, such a website is not specifically illustrated in FIG. 1 for the sake of clarity and conciseness).

The processed content may be rendered together with the URL which includes the indexable fragment, to thereby obtain rendered content (208). For example, the rendering system 120 may, as described above, render the processed content together with the URL which includes the indexable fragment to obtain the rendered content 122, including a DOM tree representation of the website 112, i.e., to obtain a rendered version thereof which corresponds to an experience of the user in viewing the website 112, i.e., which includes rendering of all relevant embedded resources (e.g., Javascript code, cascaded style sheets, images, and other dynamic and/or client side content and/or resources).

The rendered content may thus be converted into indexable content (210). For example, the content converter 124 may be configured to convert the rendered content 122 corresponding to the websites 118 and/or 112 into corresponding content within the indexable content 126. For example, in the examples above in which the rendered content 122 includes a DOM tree corresponding to a rendering of the website 112, the content converter 124 may be configured to serialize the DOM tree and thereby obtain an HTML representation of the website 112 which includes HTML content representing rendered versions of all relevant dynamic, client side content, as described above.

Thus, as described, the indexer 104 may thus be enabled to proceed with otherwise conventional indexing of the resulting indexable content (e.g., the HTML representation obtained from the serialization of the DOM tree). In this way, as described above, the full and actual content of the website 112, as viewed by a user who partially updates or modifies the website 118, may be made fully indexable, and therefore available, for storage of indexed content therefrom within the index 106.

Figure 3:
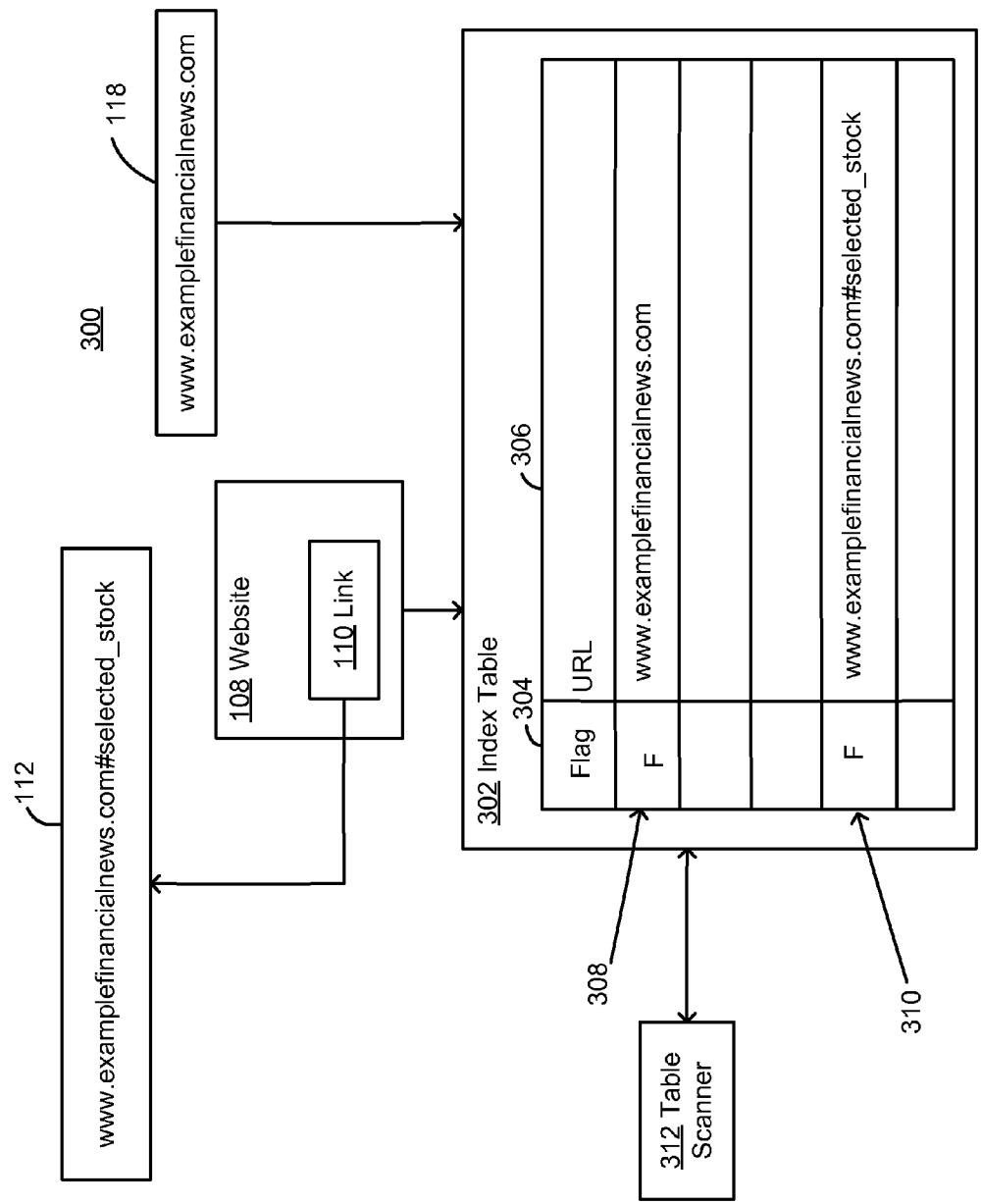
FIG. 3 is a block diagram illustrating a table scanning technique that may be used in indexing content of a website having a URL with an indexable fragment.

FIG. 3 is a block diagram of a more detailed example implementation illustrating example operations of the system 100 of FIG. 1. In the example of FIG. 3, and consistently with the examples provided above, it is illustrated that the website 108 (which may represent, e.g., virtually any blog, discussion group, article, or other website which may provide a link to a URL with an indexable fragment) includes the link 110 to the website 112. As described, the website 112 may include a URL with an indexable fragment, described above and illustrated in the example of FIG. 3 as the URL www.examplefinancialnews.com#selected_stock. Meanwhile, as also described, the underlying website 118, from which the website 112 was obtained through a partial updating or other client side manipulation, may include the base URL www.examplefinancialnews.com.

As described above with respect to FIGS. 1 and 2, it may occur that the URL inspector 114, in response to crawling of the website 108 and associated link extraction of the link 110 therefrom, may inspect the URL with indexable fragment of the website 112, and may determine that the portion "#selected_stock" is a fragment, and, further, is an indexable fragment which indicates the inclusion of dynamic content. Thereafter, as also described, the URL separator 116 may separate the URL with indexable fragment of the website 112 from an underlying base URL (associated with the website 118).

As described above, the URL separator 116 may be configured to store the base URL and the URL which includes the indexable fragment in association with one another. For example, such storage may occur within the index 106. With respect to the base URL of the website 118, such storage may include or coincide with associated processing of the content thereof (e.g., associated crawling and/or indexing processing).

In the example of FIG. 3, the index 106 is illustrated as including an index table 302. That is, FIG. 3 illustrates an example in which index information is stored in table form. In such examples, it may occur that such an index table includes various URLs, together with content and/or processed content determined from the crawler 102 and/or the indexer 104. In such cases, it may occur that the various URLs are identifiable by associated, corresponding unique identifiers (e.g., table keys), or that the URLs are uniquely identifiable, and stored as such within the index table 302.

Within such index tables, therefore, it may be appreciated that various columns related to the indexing of index content, and subsequent use thereof, may be included. Many such columns and associated column identifiers are well known, and are not described here in detail. Rather, in the simplified example of FIG. 3, the index table 302 is illustrated merely as including a column 304 which includes an optional flag for marking or otherwise identifying a URL within a same row and stored within a column 306. As described herein, the use of the flag column 304 may enable an association of a base URL and any corresponding URLs with indexable fragments, so that, for example, such URLs may be easily passed together to the rendering system 120.

For example, continuing the example above, it may occur that the URL inspector 114 has passed the URL with indexable fragments of the website 112 to the URL separator 116, which thereafter separates the base URL of the website 118 and stores both URLs within the index table 302. Specifically, as shown, the URL separator 116 may store the base URL of the website 118 within a row 308, while storing the URL which includes the indexable fragment of the website 112 within row 310 of the index table 302. As shown, during the storing of each URL, the URL separator 116 may be configured to set a value of a corresponding flag (e.g., in the example, by setting a value to "F" within the flag column 304 for each row 308, 310).

As referenced above, and as described in more detail below with respect to the example of FIG. 4, it may occur that at a later time the crawler 102 and/or the indexer 104 may proceed with crawling and/or indexing the website 118 with the base URL, e.g., based on a corresponding link extraction thereof from a different, non-illustrated website. At such time, a table scanner 312 may be utilized to detect a presence of the flag associated with the base URL within the row 308, and included within the column 304. Upon such detection, the table scanner 312 may proceed with scanning remaining rows of the index table 302, so as to determine other rows which include a positive value for the flag indicator within the column 304, and which include a stored URL which at least partially matches the base URL of the row 308.

In the example of FIG. 3, therefore, the table scanner 312 may detect the flag value within the row 310, and may determine that the associated URL includes the common URL www.examplefinancialnews.com. Consequently, it may be appreciated that the use of the flag column 304 and associated table scanner 312 enables the URL separator 116 to store the URL with indexable fragment and its associated base URL in association with one another within the index table 302. As a result, as described above, both URLs (and any associated processed content thereof) may be passed together to the rendering system 120 to thereby obtain the rendered content 122.

In the simplified example of FIG. 3, only the single row 310 is illustrated as including the flag and associated URL www.examplefinancialnews.com. However, it may be appreciated that the website 118 may have many different possibilities for being partially or otherwise modified through the use of dynamic, client side operations. As a result, it may be appreciated that many websites analogous to the website 112 in as much as such websites may be created through the use or execution of such dynamic content with respect to the website 118, may be stored within the index table 302, and may be associated through the use of the flag column 304 with the base URL (e.g., www.examplefinancialnews.com). As a result, all such webpages and associated URLs with indexable fragments may be associated with the underlying base URL of the website 118, and may thereafter be passed together therewith to the rendering system 120. In this way, rendered content (and ultimately indexable content) may be obtained for all such websites.

Figure 4:
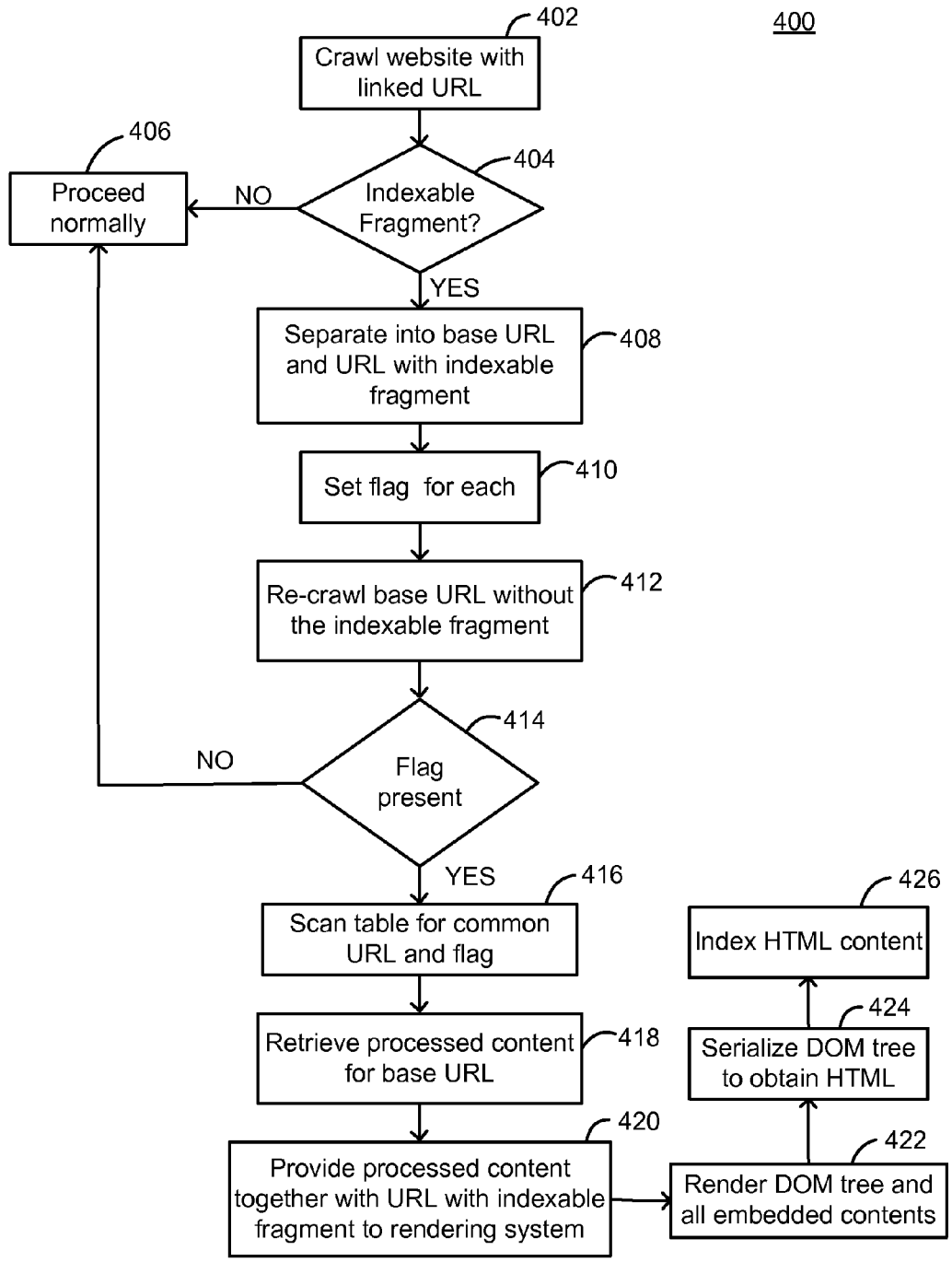
FIG. 4 is a flowchart illustrating more detailed example operations of the system of FIG. 1 using the table scanning techniques of FIG. 3.

FIG. 4 is a flowchart 400 illustrating more detailed example operations of the system 100 of FIG. 1, in the context of the example of FIG. 3. Therefore, as described above, operations may begin with the crawling of the website which includes a linked URL (402). For example, the crawler 102 may crawl the website 108 which includes the link 110.

If the thus-extracted link does not include an indexable fragment (404), then subsequent crawling and/or indexing procedures may proceed normally (406). If an indexable fragment is, however, included within the linked URL (404), then such a URL may be separated into a base URL and the URL which includes the indexable fragment (408).

As shown in the example of FIG. 3, such operations may result in the identification and separation of the base URL of the website 118 and the URL with indexable fragment of the website 112. Consequently, both URLs may be stored within the index table 302, and corresponding flags with the column 304 may be set for each URL within corresponding rows 308, 310 (410).

At a later time, it may occur that the website 118 of the base URL without the indexable fragment may be re-crawled and/or otherwise processed by the crawler 102 and/or the indexer 104 (412). As referenced above, it may be efficient or otherwise desirable to allow such re-crawling to occur within normal operations of the crawler 102 in executing crawling of its assigned domain(s).

During such re-crawling, the table scanner 312 may be configured to determine whether a flag exists within the flag column of the corresponding row of the index table 302 (414). If not, any such URL may be indexed or otherwise processed in a normal manner (406). If, however, a flag is present (414), then the table scanner 312 may proceed to scan the index table 302 for any included URLs having a common URL and having a flag present within the flag column 304 (416). In conjunction with finding such a common URL within the index table 302, processed content for the base URL may be retrieved (418), so that such processed content identified by the base URL may be provided together with the URL which includes the indexable fragment, as located by the table scanner 312, to the rendering system 120 (420).

The rendering system 120 may thereafter proceed to render the received content as a DOM tree in which all embedded resources and other content present within the website 112 are included (422). In this way, content converter 124 may proceed to serialize the resulting DOM tree to obtain an HTML representation of the website 112 (424). As a result, the indexer 104 may proceed with conventional indexing operations with respect to the html content (416), so as to thereby obtain a fully indexed version of the website 112.

Although the above description provides many, non-limiting examples, it may be appreciated that many other implementations are contemplated. For example, although the description references URLs for identifying websites, it may be appreciated that such terminology may refer to various identifiers and/or locators of network content. For example, Extensible Resource Identifiers (XRIs), Internationalized Resource Identifiers (IRIs), and other identifiers and/or locators may be used in the system 100 of FIG. 1. Further, other techniques besides creation and serialization of DOM trees may be used to create rendered and ultimately indexable content. For example, in additional or alternative embodiments, the indexable content may include XML. Other variations and implementations would be apparent to one of skill in the art.

Figure 5:
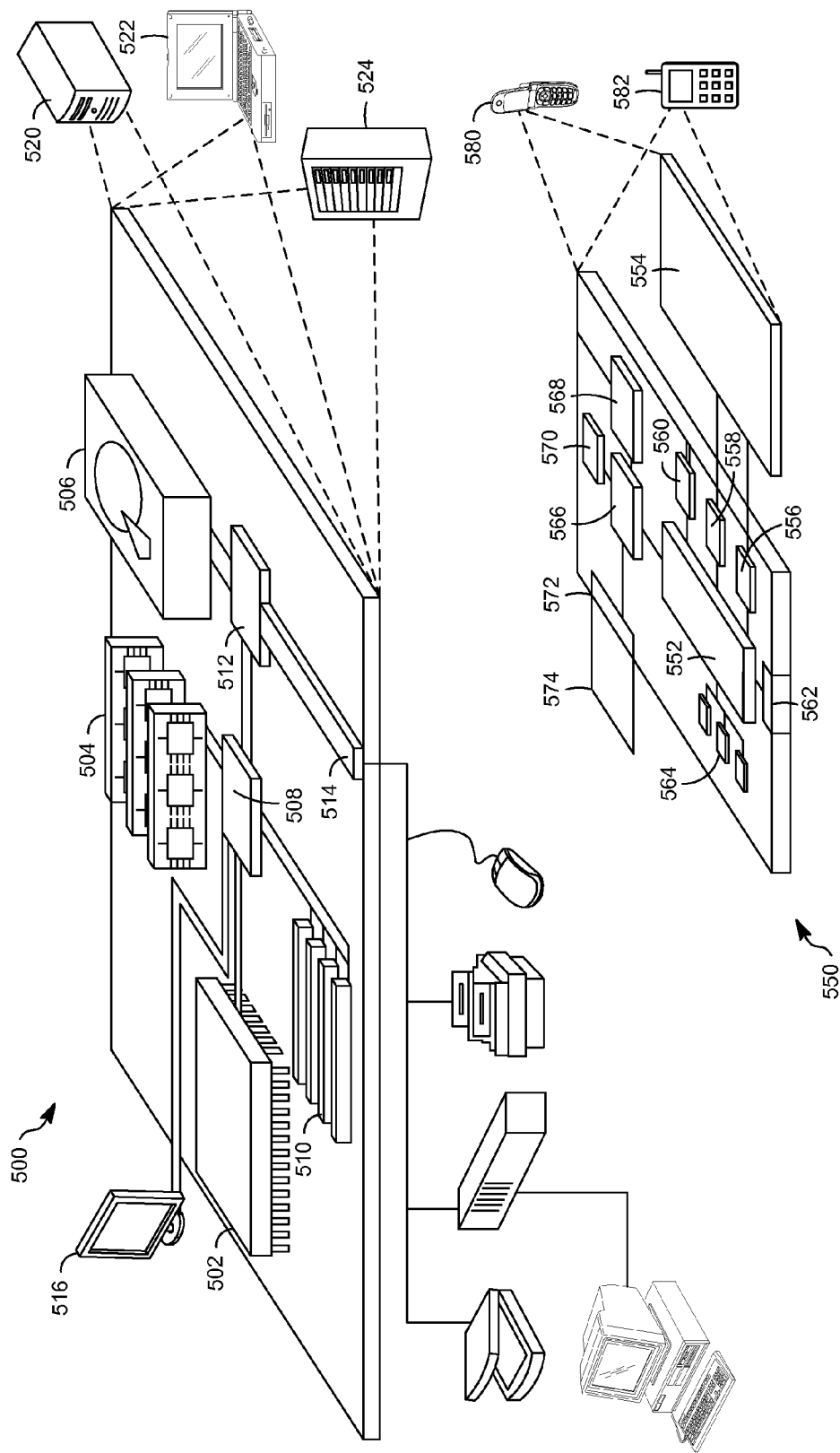
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input and/or output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input and/or output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input and/or output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly and/or machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computer system including instructions stored on a non-transitory computer-readable storage device and executable by at least one processor, the computer system comprising:
    a URL inspector configured to cause the at least one processor to determine a uniform resource locator (URL) which includes an indexable fragment, the indexable fragment being associated with dynamic content rendered in a website identified by the URL which includes the indexable fragment, the dynamic content being associated with executable code configured to be executed by a browser rendering the website to thereby perform a partial modification of a previously-rendered version of the website:
    a URL separator configured to cause the at least one processor to separate, from the URL which includes the indexable fragment, a base URL occurring prior to the indexable fragment;
    an indexer configured to cause the at least one processor to process content identified by the base URL to obtain processed content thereof, wherein the processed content does not include embedded resources to be rendered;
    a rendering system configured to cause the at least one processor to render the processed content together with content identified by the URL which includes the indexable fragment to obtain rendered content, wherein the rendered content includes rendering of the embedded resources; and
    a content converter configured to cause the at least one processor to convert the rendered content into indexable content, the indexable content including markup language code.

2. The system of claim 1 wherein the URL inspector is configured to determine the URL which includes the indexable fragment in conjunction with a crawling of a website which includes a link to the URL which includes the indexable fragment.

3. The system of claim 1 wherein the URL inspector is configured to distinguish the indexable fragment from a pointer fragment designed to identify a specific portion of a website.

4. The system of claim 1 wherein the URL separator is configured to store the base URL in association with the URL which includes the indexable fragment, using one or more memories.

5. The system of claim 4, wherein the association includes a common identifier assigned to the base URL and to the URL which includes the indexable fragment within the at least one memory.

6. The system of claim 1 wherein the indexer is configured to process the content of the base URL including crawling the content of the base URL.

7. The system of claim 1 wherein the indexer is configured to process the base URL to obtain the processed content in association with a subsequent re-crawling of the content of the base URL.

8. The system of claim 1 wherein the rendering system is configured to render the processed content to obtain the rendered content, including executing included executable code designed to be executed by a client-side application.

9. The system of claim 1 wherein the rendering system is configured to render the processed content to obtain the rendered content, including outputting a document object model (DOM) tree within the rendered content, the DOM tree including dynamically updated portions of the website associated with the indexable fragment.

10. The system of claim 9 wherein the content converter is configured to convert the rendered content including serializing the DOM tree to obtain HyperText Markup Language (HTML) code.

11. The system of claim 1, wherein the indexable fragment is a fragment included within the URL and providing identification of a client side execution and a dynamic updating of an underlying website.

12. A computer-implemented method including executing instructions stored on a non-transitory computer-readable storage device, the method comprising:
    determining a uniform resource locator (URL) which includes an indexable fragment, the indexable fragment being associated with dynamic content rendered in a website identified by the URL which includes the indexable fragment, the dynamic content being associated with executable code configured to be executed by a browser rendering the website to thereby perform a partial modification of a previously-rendered version of the website;
    separating, from the URL which includes the indexable fragment, a base URL occurring prior to the indexable fragment;
    processing content identified by the base URL to obtain processed content thereof, wherein the processed content does not include embedded resources to be rendered;
    rendering the processed content together with content identified by the URL which includes the indexable fragment to obtain rendered content, wherein the rendered content includes rendering of the embedded resources; and
    converting the rendered content into indexable content, the indexable content including markup language code.

13. The method of claim 12, wherein determining the URL which includes the indexable fragment is performed in conjunction with a crawling of a website which includes a link to the URL which includes the indexable fragment.

14. A computer program product, the computer program product being tangibly embodied on a non-transitory computer-readable storage device and including executable code that, when executed, is configured to cause a data processing apparatus to:
    determine a uniform resource locator (URL) which includes an indexable fragment, the indexable fragment being associated with dynamic content rendered in a website identified by the URL which includes the indexable fragment the dynamic content being associated with executable code configured to be executed by a browser rendering the website to thereby perform a partial modification of a previously-rendered version of the website;

separate, from the URL which includes the indexable fragment, a base URL occurring prior to the indexable fragment;

process content identified by the base URL to obtain processed content thereof, wherein the processed content does not include embedded resources to be rendered;

render the processed content together with content identified by the URL which includes the indexable fragment to obtain rendered content, wherein the rendered content includes rendering of the embedded resources; and convert the rendered content into indexable content, the indexable content including markup language code.

15. The computer program product of claim 14, wherein the URL which includes the indexable fragment is determined in conjunction with a crawling of a website which includes a link to the URL which includes the indexable fragment.

16. The computer program product of claim 14, wherein the base URL is stored in association with the URL which includes the indexable fragment, using one or more memories.

17. The computer program product of claim 14, wherein the processed content is rendered to obtain the rendered content, including executing included executable code designed to be executed by a client-side application.

18. The computer program product of claim 14 wherein the processed content includes crawled content of the base URL.

* * * * *